United States Patent [19]

Marshall et al.

[11] 4,100,956
[45] Jul. 18, 1978

[54] TIRE INFLATION COUPLING APPARATUS

[76] Inventors: Richard M. Marshall; Margaret V. Marshall, both of The Renaissance, Apt. 20-06 1360 S. Ocean Blvd., Pompano Beach, Fla. 33062

[21] Appl. No.: 776,837
[22] Filed: Mar. 14, 1977
[51] Int. Cl.² ............................................. B60C 29/00
[52] U.S. Cl. .................................. 152/427; 73/146.8; 137/223
[58] Field of Search ............ 152/415, 418–422, 152/427–431; 141/8, 38, 59; 138/89.1–89.4; 137/227, 223; 73/146.8; 116/34

[56] References Cited

U.S. PATENT DOCUMENTS

| 984,453 | 2/1911 | Terpening | 152/415 |
| 1,548,755 | 8/1925 | Sattler | 152/431 |
| 3,528,083 | 9/1970 | Parker | 116/34 R |

FOREIGN PATENT DOCUMENTS 318,894  12/1930  United Kingdom ................ 152/415

Primary Examiner—Drayton E. Hoffman
Assistant Examiner—Donald W. Underwood
Attorney, Agent, or Firm—Robert D. Farkas

[57] ABSTRACT

A tire inflation coupling apparatus utilizes a pair of rigid pipes hydraulically connected to one another at an acute angle wherein the angle is responsive to the amount of air pressure within the apparatus. The fill end of one pipe is provided with a standard automobile tire valve assembly. The free end of the other pipe is adapted to be coupled to a downwardly directed valve stem of a tire stored within the trunk of a motor vehicle. The apparatus serves to facilitate convenient periodic storing of compressed air into the tire while acting to indicate the inflation of the tire.

2 Claims, 3 Drawing Figures

TIRE INFLATION COUPLING APPARATUS

BACKGROUND OF THE INVENTION

1. Field of the Invention

This invention relates to tire inflation devices and more particularly, to that class adapted to indicate the amount of air pressure stored within the tire.

2. Description of the Prior Art

The prior art abounds with hydraulic communicating pipes and hoses having pressure indicating means thereon, useful in transmitting compressed air into a tire. Typical of such apparatus is the disclosure made in U.S. Pat. No. 2,227,601 issued on Jan. 7, 1941 to W. B. O'Brien, Jr.

SUMMARY OF THE INVENTION

A primary object of the present invention is to provide a tire inflation device which facilitates injecting compressed air into a tire when the tire is installed in a storage position in a motor vehicle.

Another object is to provide a compressed air communicating device which roughly indicates the quantity of compressed air contained within the device.

Still another object is to provide a compressed air coupling device which is adapted to bring a tire valve inlet end thereof into view when the compartment housing the tire to which the device is attached is opened.

Yet another object is to provide a coupling device, in accordance with the preceeding objects, which is simple in construction, relatively inexpensive, and effective for its particular purposes.

Most spare tire and wheel assemblies are stored within the trunk compartment of automobiles having the rubber-like valve stem extending downwardly so as to avoid accidental damage due to impact with other articles stored within the trunk. This arrangement causes the compressed air receiving end of the stem to be relatively inexcessible thereby virtually preventing periodic checking and replenishment of the compressed air within the tire. The present invention utilizes a conduit, one end of which being connected to the valve stem of the tire and the other end of which being directed substantially upwardly through one of the centrally located holes of the wheel. The conduit is provided with a conventional tire valve end at the uppermost end thereof. The other end of the conduit hydraulically communicates with the interior of the tire by maintaining the tire valve in an open position. Since the mid-portion of the conduit is made out of flexible material, the ends of the conduit are permitted to change their angular relationship to one another as a function of the amount of air pressure statically contained within the conduit. Thus, the user is provided with a conveniently located compressed air inlet port and an effective though crude pressure indicating device, visible at a glance, at each occasion that the trunk of the vehicle is opened.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a pair of straight lengths of metallic pipe, preferably fabricated from aluminum or steel. One end of each of the pipes bears external threads of the pitch and diameter equivalent to the threads carried by the stem of an automobile tire. The same end of one of the pipes is fitted with a check valve, biased into the closed position, and operated into the open position by a stem rod, identical in design to the valve and stem rods utilized by conventional automobile tire stems. A tube is provided having internal threads, complimentary to the external threads on the same end of the other pipe and is threaded thereto. A circular plate is installed in the passageway of the tube having the lateral surfaces thereof residing at right angles to the longitudinal axis of the tube. The tube is preferably fabricated from aluminum or steel, as is the circular plate. Holes, constituting air passageways communicate through to the lateral surfaces of the plate at any location save the central regions thereof. A length of rubber-like hose, having the longitudinal axis of the ends thereof disposed at an acute angle, is attached to each of the other ends of the pipes, causing the longitudinal axis of the straight pipes to be aligned at the same acute angle as the ends of the hose. The thickness of the walls of the hose is selected to withstand the maximum pressure to be contained by the tire.

In use, the free end of the tube is threadingly installed to the free end of the tire stem of the spare tire of the vehicle. The length of pipe containing the conventional tire valve is disposed passing through an opening in the central portions of the wheel carrying the tire. When so installed, the air pressure within the tire communicates through its now opened valve into the interior of the present invention and is retained therein due to the closed condition of the conventional tire valve installed at the free end of the pipe passing through the wheel of the tire. The plate, desribed above, maintains the valve of the tire in an open position. When the tire is fully inflated, the compressed air inlet port adjacent to the conventional tire valve end of the pipe passing through the wheel is maintained in a rear upright position by the action of the compressed air on the walls of the hose. As the level of air pressure within the tire and conduit decreases, the hose wall experiences a lessened amount of compressed air causing a change in the angular relationship between the pipes, serving as an indicator of the amount of air pressure currently contained by the tire.

Figure 1:
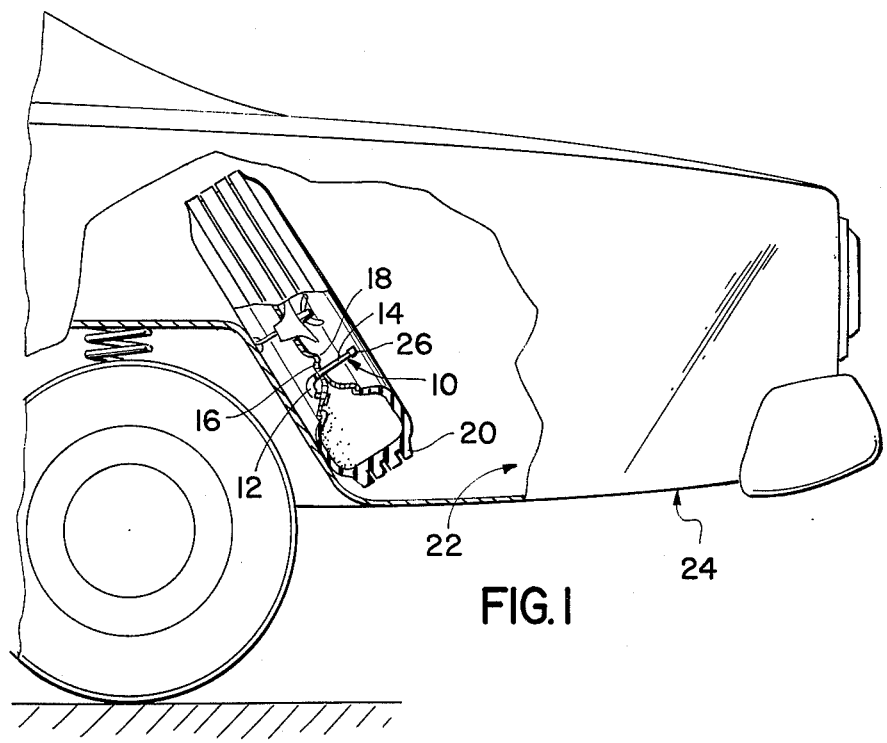
FIG. 1 is a side elevation view of the present invention shown installed on a tire stored in the trunk of a motor vehicle.

Now referring to the Figures, and more particularly to the embodiment illustrated in FIG. 1 showing the present invention 10 installed on a tire stem 12 having end 14 thereof pass through an opening 16 of the wheel 18 carrying tire 20. The tire is shown having its stem 12 directed downwardly when the tire is stored within the trunk compartment 22 of an automobile 24. Removable cap 26 is shown installed on end 14.

Figure 2:
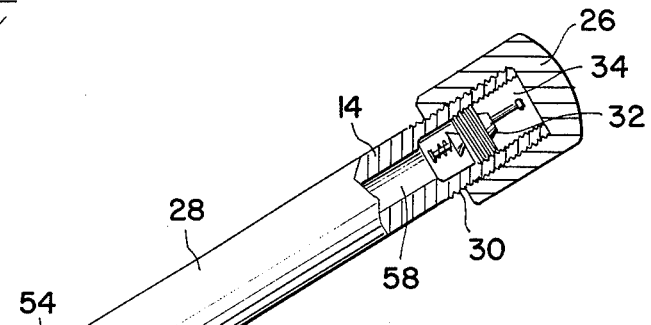
FIG. 2 is a side elevation view of the present invention.

FIG. 2 shows tire stem 12 of tire 20 shown in FIG. 1. Rigid pipe 28 has end 14 thereof provided with external male threads 30 and a conventional tire check valve and stem assembly 32. Cap 26 protects the compressed air inlet port 34 and male threads 30 from dirt and injury. Rigid pipe 36 is provided with external male threads 38 to which tube 40 is threadingly engaged. Plate 42 is installed within tube 40 having the lateral surfaces 44 and 46 thereof disposed substantially at right angles to the longitudinal axis of pipe 36. The free end 50 of valve stem 48 of tire stem 12 engages plate 42, causing the valve assembly installed within the stem 12 to be maintained in an open position. Rubber-like hose 52 hydraulically couples end 54 of pipe 28 to end 56 of pipe 36 together maintaining the longitudinal axis of pipe 36 and the longitudinal axis of pipe 28 at an acute angular relationship dependent upon the amount of air pressure contained within passageway 58 and tire 20, shown in FIG. 1.

Figure 3:
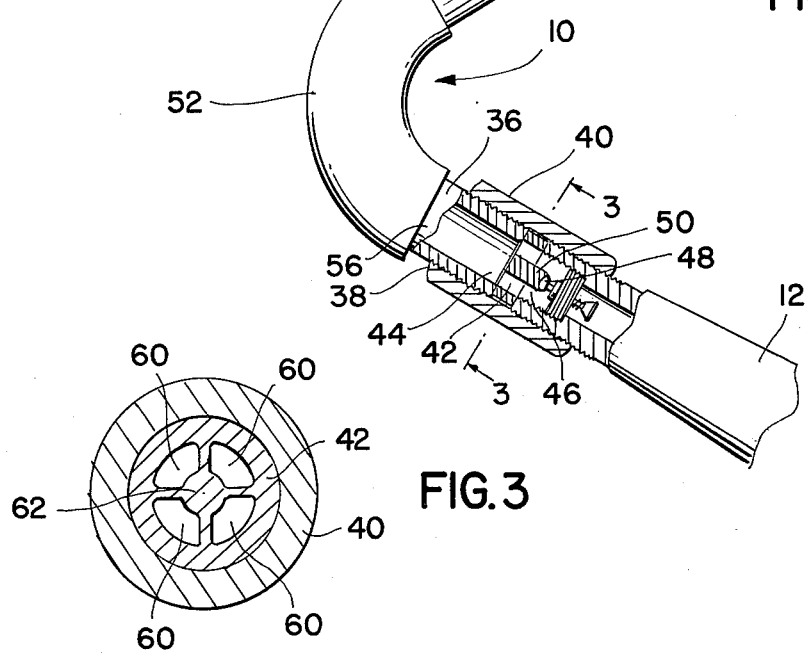
FIG. 3 is a cross-sectional elevation view taken along line 3—3 viewed in the direction of arrows 3—3, as shown in FIG. 2.

FIG. 3 illustrates plate 42 installed athwart the interior of tube 40 having holes 60 passing through the plate. Central region 62 is shown devoid of holes, but with a raised center portion either by way of rivet or by an extrusion, not shown, permitting free end 50 of valve stem 48, shown in FIG. 2, to be displaced causing valve stem 48 to be disposed in such a manner so as to allow the air pressure of tire 20, shown in FIG. 1, to communicate to passageway 58, shown in FIG. 2.

One of the advantages of the present invention is to provide a tire inflation hose which facilitates injecting compressed air into a tire when the tire is installed in a storage position in a motor vehicle.

Another advantage is to provide a compressed air communicating device which roughly indicates the quantity of compressed air contained within the device.

Still another advantage is to provide a compressed air coupling device which is adapted to bring a tire valve inlet end thereof into view when the compartment housing the tire to which the device is attached is opened.

Yet another advantage is to provide a coupling device, in accordance with the preceeding objects, which is simple in construction, relatively inexpensive, and effective for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appended claims.

The embodiment of the invention in which an exclusive privilege or property is claimed are defined as follows:

I claim:

1. A tire inflation coupling apparatus comprising a first length of rigid pipe, one end of said first pipe having external threads thereon, a tube, said tube having internal threads fixed to the interior surface of the interior wall thereof, a circular plate, said circular plate being disposed within said tube, said circular plate having the lateral surfaces thereof being disposed substantially at right angles to the longitudinal axis of said tube, said circular plate having at least one opening communicating between said lateral surfaces, said tube threadingly engaged to said external threads on said first pipe, a second length of rigid pipe, one end of said second pipe containing a check valve therein, said check valve having a stem rod affixed thereto, said check valve being biased in a closed position, a length of rubber-like hose, said hose being preformed having the ends thereof at an acute angle to each other, the other end of said first pipe being disposed inserted into one end of said hose, the other end of said second pipe being disposed inserted into the other end of said hose, said hose being flexible so as to respond to a change in air pressure within said hose causing said angle to change, whereby serving to indicate the inflation of the tire.

2. The tire inflation coupling apparatus as claimed in claim 1, wherein said hose is fabricated from a resilient rubber-like material.

* * * * *